(12) United States Patent
Keene et al.

(10) Patent No.: US 10,235,868 B2
(45) Date of Patent: Mar. 19, 2019

(54) EMBEDDED SHARED LOGICAL INSTRUMENT

(71) Applicant: NATIONAL INSTRUMENTS CORPORATION, Austin, TX (US)

(72) Inventors: Richard Henry Mace Keene, Gwent (GB); Jan Viborg Moeller, Greve (DK)

(73) Assignee: National Instruments Corporation, Austin, TX (US)

( * ) Notice: Subject to any disclaimer, the term of this patent is extended or adjusted under 35 U.S.C. 154(b) by 1207 days.

(21) Appl. No.: 14/500,781

(22) Filed: Sep. 29, 2014

(65) Prior Publication Data

US 2016/0091876 A1 Mar. 31, 2016

(51) Int. Cl.
*G08C 15/02* (2006.01)
*H04L 1/00* (2006.01)
*G06F 11/273* (2006.01)

(52) U.S. Cl.
CPC .......... *G08C 15/02* (2013.01); *G06F 11/2733* (2013.01); *H04L 1/00* (2013.01)

(58) Field of Classification Search
None
See application file for complete search history.

(56) References Cited

U.S. PATENT DOCUMENTS

| | | | | |
|---|---|---|---|---|
| 5,136,705 A * | 8/1992 | Stubbs | ........... | G01B 31/318307 714/27 |
| 6,512,988 B1 * | 1/2003 | Kanago | ............... | G06F 11/2733 702/123 |
| 6,587,671 B1 * | 7/2003 | Kanago | ................. | H04W 24/00 324/754.31 |
| 7,500,082 B2 * | 3/2009 | Kumar | .................. | G06F 3/0614 702/182 |
| 8,214,692 B1 * | 7/2012 | Spalink | ............... | G06F 11/2273 713/1 |
| 9,329,976 B1 * | 5/2016 | Singh | .................. | G06F 11/3688 |
| 9,600,386 B1 * | 3/2017 | Thai | ...................... | G06F 11/263 |
| 9,804,649 B2 * | 10/2017 | Cohen | ..................... | G06F 1/263 |
| 2005/0193306 A1 * | 9/2005 | Luff | ................... | G01R 31/2834 714/746 |

(Continued)

*Primary Examiner* — Patrice L Winder
(74) *Attorney, Agent, or Firm* — Meyertons Hood Kivlin Kowert and Goetzel PC; Jeffrey C. Hood

(57) ABSTRACT

System and method for controlling a custom modular measurement system. An editor may receive user input specifying one or more system definitions, each mapping message based commands, parameters, variables and/or metadata ("information") accordant with a control protocol for standalone instruments to functions and data in a programming language, and generates the definitions accordingly, each being useable by a client application to interface with a custom modular measurement system that includes multiple logical instruments via the message based information. At least one of the definitions may be deployed onto the measurement system. A run-time engine of the measurement system may accept a message based command from the application, and call a corresponding function, which may invoke operation of at least one of the logical instruments. The logical instruments may be operated concurrently, including sharing use of a single physical measurement device by at least two of the logical instruments.

24 Claims, 16 Drawing Sheets

(56) References Cited

U.S. PATENT DOCUMENTS

| | | | |
|---|---|---|---|
| 2006/0007941 A1 | 1/2006 | Fabbio | |
| 2007/0169042 A1* | 7/2007 | Janczewski | G06F 8/314 717/149 |
| 2007/0294580 A1* | 12/2007 | Lu | G01R 31/318357 714/33 |
| 2008/0021669 A1* | 1/2008 | Blancha | G01R 31/2834 702/122 |
| 2008/0208362 A1* | 8/2008 | Grgic | G06F 9/5077 700/2 |
| 2012/0124572 A1* | 5/2012 | Cunningham | G06F 9/45558 718/1 |
| 2013/0159223 A1* | 6/2013 | Bahl | G01D 1/00 706/12 |
| 2013/0173962 A1* | 7/2013 | Li | G06F 11/3688 714/32 |
| 2013/0246853 A1* | 9/2013 | Salame | G06F 11/079 714/37 |
| 2014/0005974 A1* | 1/2014 | Vyas | G06F 11/263 702/123 |
| 2014/0189430 A1* | 7/2014 | Hilliges | G01R 31/2834 714/27 |
| 2015/0020050 A1* | 1/2015 | Dain | G06F 11/263 717/124 |
| 2015/0026667 A1* | 1/2015 | Pruss | G06F 11/3668 717/135 |
| 2015/0182961 A1* | 7/2015 | Arnold | B01L 99/00 709/219 |
| 2015/0304332 A1* | 10/2015 | Ruth | H04L 43/50 726/7 |
| 2016/0224460 A1* | 8/2016 | Bryant | G06F 8/61 |

\* cited by examiner

```
┌─────────────────────────────────────────────────────────────┐
│ configure a custom modular measurement system that includes │
│ a plurality of logical instruments, each logical instrument │
│ configured to perform measurement functions via at least    │
│ one corresponding physical measurement device, a plurality  │
│ of isolated memory spaces in the memory, each configured    │
│ to store configuration information and working data for a   │
│ respective logical instrument, and at least one measurement │
│ engine                                                       │
│ 1302                                                         │
└─────────────────────────────────────────────────────────────┘
                              │
                              ▼
┌─────────────────────────────────────────────────────────────┐
│ operate the custom modular measurement system, including   │
│ operating the plurality of logical instruments concurrently,│
│ including, for each logical instrument:                     │
│                                                              │
│   ┌───────────────────────────────────────────────────┐    │
│   │ communicate with a respective client application   │    │
│   │ independently                                       │    │
│   │ 1312                                                │    │
│   └───────────────────────────────────────────────────┘    │
│                        │                                     │
│                        ▼                                     │
│   ┌───────────────────────────────────────────────────┐    │
│   │ acquire, generate, or process data using the at    │    │
│   │ least one corresponding physical measurement       │    │
│   │ device via the at least one measurement engine     │    │
│   │ per the configuration information                  │    │
│   │ 1314                                                │    │
│   └───────────────────────────────────────────────────┘    │
│                                                              │
│ where operating the plurality of logical instruments        │
│ concurrently includes sharing use of a single physical      │
│ measurement device by at least two of the logical           │
│ instruments                                                  │
│ 1304                                                         │
└─────────────────────────────────────────────────────────────┘
```

Figure 13

EMBEDDED SHARED LOGICAL INSTRUMENT

FIELD OF THE INVENTION

The present disclosure relates to the field of instrumentation, and more particularly to logical instrumentation, specifically, a remote interface to logical instruments, and a device for implementing logical instrumentation.

DESCRIPTION OF THE RELATED ART

Developers of automated test systems often want to implement a distributed architecture where a custom modular measurement system is physically separated from an automated test control system but coupled via a network. Typical modular measurement systems consist of one or more measurement devices and associated software drivers, an embedded controller/processor, and a software run-time system to call and coordinate the drivers for the measurement devices, sometimes concurrently. Typical automated test control systems consist of a host computer running a software program that sends commands to the modular measurement system and receives and then processes the results.

Such modular measurement systems need a mechanism to export an interface that can be invoked over a network. One approach is to provide a control protocol for standalone instruments such as SCPI (Standard Commands for Programmable Instruments) interface. SCPI is a popular standard for communicating with and controlling measurement devices which defines standard instrument commands transmitted as ASCII string over a communication bus.

In a typical prior art automated system as described above, the SCPI interface would necessarily be custom, i.e., would require customization. However, it is very difficult to create a custom SCPI interface to a custom modular measurement system.

Additionally, in current automated test systems the ratio between automated test stations and measurement equipment is 1:1. The usage of an individual instrument is often below 50% which means that the high value asset of the instrument is used less than half the time. One approach to increase the utilization of such assets is to share the instrument between different testers, e.g., host computers executing testing software, such as in a test executive application or system. Many test systems utilize a control protocol for standalone instruments to communicate with and control instruments, e.g., SCPI; however, sharing a SCPI based instrument is no trivial task as SCPI commands by definition are or include stateful data, where the total configuration is performed in small pieces at a time. This means that if the instrument is shared between two testers A and B, the commands of tester A can conflict with settings used by tester B and vice versa.

As illustrated in prior art FIG. 1, locking the instrument, e.g., using Virtual Instrument Software Architecture (VISA) locks, as provided by National Instruments Corporation, allows tester A to complete Configure, Measure (e.g., Acquire and Process), and Result Readback phases of testing before tester B can acquire the lock and lock out tester A. As FIG. 1 shows, Tester A locks the device, thus limiting the device to Tester A's use, including the Configure, Measure, and Readback phases of testing, during which Tester B is blocked from using the device. As shown, once Tester A's testing is done, Tester A unlocks the device, and Tester B locks the device, thus limiting the device to Tester B's use, including the Configure, Measure, and Readback phases of testing, during which Tester A is blocked from using the device. Upon completion of Tester B's testing, Tester B may unlock the device.

This approach, however, is quite inefficient as the instrument hardware is locked from the time the first Configure phase command is sent until the last result Readback command is received. Ideally, the only time the instrument hardware actually needs to be locked and blocking any other processes is during the Measure phase.

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of systems and methods for logical instrumentation are presented below. A system configured according to embodiments of the techniques disclosed herein may include a client application, and a custom modular measurement system, coupled to the client application. The custom modular measurement system may include a controller, including: one or more system definitions, where each system definition maps message based commands, parameters, variables, and/or metadata accordant with a control protocol for standalone instruments to functions and data in a programming language, and a run-time engine. The custom modular measurement system may further include a plurality of logical instruments, coupled to or comprised in the controller, where the client application may be configured to send one or more message based commands, parameters, variables, and/or metadata accordant with the control protocol to the custom modular measurement system. The run-time engine may be configured to: accept a message based command from the client application, call a function that corresponds to the message based command, based on at least one of the one or more system definitions, and perform said accepting and said calling a plurality of times, where at least one called function invokes operation of at least one of the logical instruments.

In one embodiment, a method for controlling a custom modular measurement system may include receiving, by an editor, user input specifying one or more system definitions, where each system definition maps message based commands, parameters, variables and/or metadata accordant with a control protocol for standalone instruments to functions and data in a programming language. The editor may generate the one or more system definitions based on the user input, where each system definition is useable by a client application to interface with a custom modular measurement system that includes multiple logical instruments via the message based commands, parameters, variables, and/or metadata. At least one of the system definitions may be deployed onto the custom modular measurement system. A run-time engine of the custom modular measurement system may accept a message based command from the client application, and may call a function that corresponds to the message based command, based on the at least one of the one or more system definitions. The run-time engine may perform said accepting and said calling a plurality of times, where at least one called function invokes operation of at least one of the logical instruments.

The method may further include the editor displaying and editing one or more functions in the programming language. In one embodiment, the method may include the editor displaying and editing at least one of the system definitions in response to user input. Moreover, the editor may create a tree of the message based commands organized in accordance with the logical instruments and measurement subsystems of the logical instruments. In one embodiment, the editor may create an integrated instrument soft front panel, where the integrated instrument soft front panel includes respective subpanels for logical instruments and/or measurement subsystems of the logical instruments, and where the integrated instrument soft front panel maps elements on the panels to the functions, parameters, variables, and/or metadata in the programming language. In some embodiments, the method may include parsing, by the run-time engine, the message based command, and determining the function based on the parsing. The above function calling may be performed in response to such determining.

Each logical instrument may represent a single physical measurement device, multiple coordinated physical measurement devices, or software, as desired. Additionally, during operation, at least two of the logical instruments may share use of a single physical measurement device. In one embodiment, at least one logical instrument may support concurrent execution of multiple independent measurement subsystems. The run-time engine may support multiple concurrent external connections to the same logical instrument.

The method may further include synchronizing, by the run-time engine, access to a physical measurement device by multiple logical instruments, or multiple measurement subsystems within a logical instrument. In one embodiment, a message containing a result of the operation may be sent to the client application.

Note that the control protocol for standalone instruments may be of any type desired. In one embodiment, the control protocol for standalone instruments may be or include SCPI (Standard Commands for Programmable Instruments). In some embodiments, the programming language may include a graphical programming language, e.g., a graphical data flow programming language, such as LabVIEW™.

In some embodiments a system may be provided that includes or supports multiple logical instruments. For example, in one embodiment, the system may include a processor, and a memory, coupled to the processor, where the memory stores program instructions executable by the processor to implement: a plurality of logical instruments, where each logical instrument is configured to perform measurement functions via at least one corresponding physical measurement device, a plurality of isolated memory spaces in the memory, where each isolated memory space is configured to store configuration information and working data for a respective logical instrument, and at least one measurement engine.

The plurality of logical instruments may be configured to operate concurrently, where each of the plurality of logical instruments may configured to communicate with a respective client application independently, and acquire, generate, or process data using the at least one corresponding physical measurement device via the at least one measurement engine per the configuration information. During operation, at least two of the logical instruments may share use of a single physical measurement device.

In some embodiments, use of a single physical measurement device by a logical instrument may include operating the single physical measurement device in a plurality of phases, including at least one phase that includes an exclusive portion that requires exclusive access to the single physical measurement device, in which case sharing may include locking, by a first logical instrument of the at least two logical instruments, the single physical measurement device for duration of the exclusive portion of the at least one phase, thereby blocking others of the at least two logical instruments from using the single physical measurement device for the duration of the exclusive portion of the at least one phase, and unlocking, by the first logical instrument of the at least two logical instruments, the single physical measurement device when the exclusive portion of the at least one phase completes, thereby allowing use of the single physical measurement device by the others of the at least two logical instruments.

In one embodiment, the exclusive portion of the at least one phase may include an acquire portion in which data are acquired via the corresponding single physical measurement device. In another embodiment, the exclusive portion of the at least one phase may include a generate portion in which signals are generated via the corresponding single physical measurement device.

In some embodiments, the at least one measurement engine may be or include a plurality of measurement engines. The plurality of measurement engines may be configured to operate concurrently. Thus, the method may include operating the plurality of measurement engines concurrently.

The above locking and unlocking the single physical measurement device may be performed via a mechanism implemented in the at least one measurement engine. For example, the mechanism may be implemented in the at least one measurement engine using operating system (OS) features, such as, for example, one or more of: one or more semaphores, or at least one mutex. In one embodiment, the mechanism may be implemented in the at least one measurement engine using virtual instrument software architecture (VISA) locks. In some embodiments, the locking or unlocking may include putting threads to sleep, and/or disabling OS interrupts.

In various embodiments, at least one logical instrument of the plurality of logical instruments is configured to provide measurement capabilities, and analysis functionality implemented in software, where the analysis functionality operates on data obtained from the at least one corresponding physical measurement device.

BRIEF DESCRIPTION OF THE DRAWINGS

A better understanding of the present invention can be obtained when the following detailed description of the preferred embodiment is considered in conjunction with the following drawings, in which:

FIG. 13 is a flowchart diagram illustrating one embodiment of a method for operating logical instruments.

Figure 1:
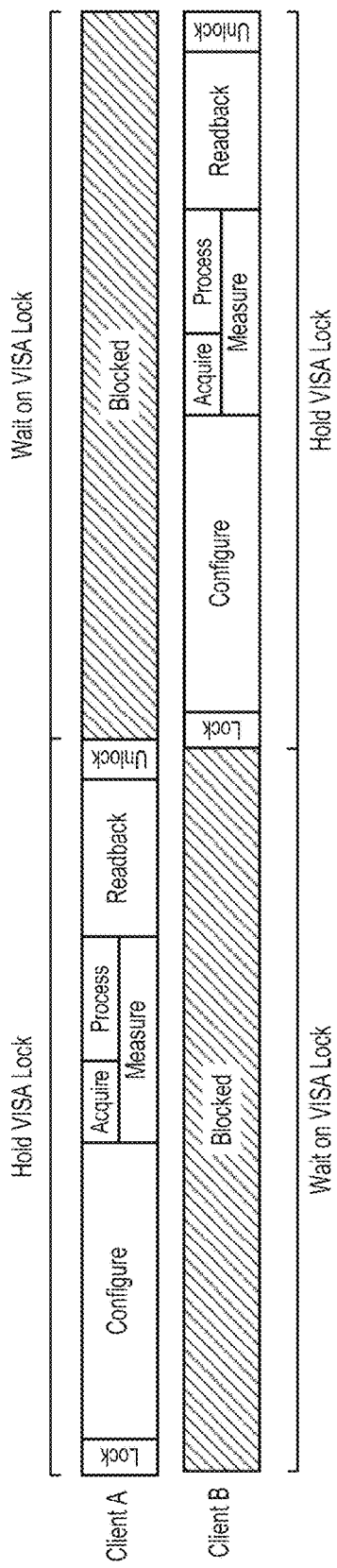
FIG. 1 illustrates device locking for multi-testing using a modular measurement device, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed.

As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Logical Instrument—refers to a software implemented instrument that provides custom measurement and/or analysis functionality to extend or enhance the capability of utilized measurement hardware.

Measurement Engine—refers to an application programming interface (API) to hardware that a logical instrument uses to control or otherwise access measurement hardware. Examples of measurement engines include, but are not limited to, device driver programs such as NI DAQmx (National Instruments data acquisition) and NI RFSA (National Instruments radio frequency signal analyzer) driver programs, among others.

Measurement Session—refers to a collection of state information, stored in hardware and/or in software, associated with a connection of a logical instrument to a physical measurement device.

Connection Session—refers to a collection of state information, stored in hardware and/or in software, associated with a connection of a client application to an instance of a logical instrument.

System Session—refers to a collection of state information, stored in hardware and/or in software, associated with an instance of a logical instrument. A system session facilitates multiple clients interacting with multiple instances of the same logical instrument.

Parser—refers to a component that analyzes a string containing one or more instrumentation commands and corresponding parameters, received from a client application, e.g., via an instrument bus, and maps the instrumentation commands and parameters to memory and actions of logical instruments.

Overview

Embodiments of the techniques disclosed herein may facilitate creation of a SCPI interface to a custom modular measurement system and may provide an associated run-time system that executes the functions associated with the SCPI commands, possibly concurrently.

Figure 2A:
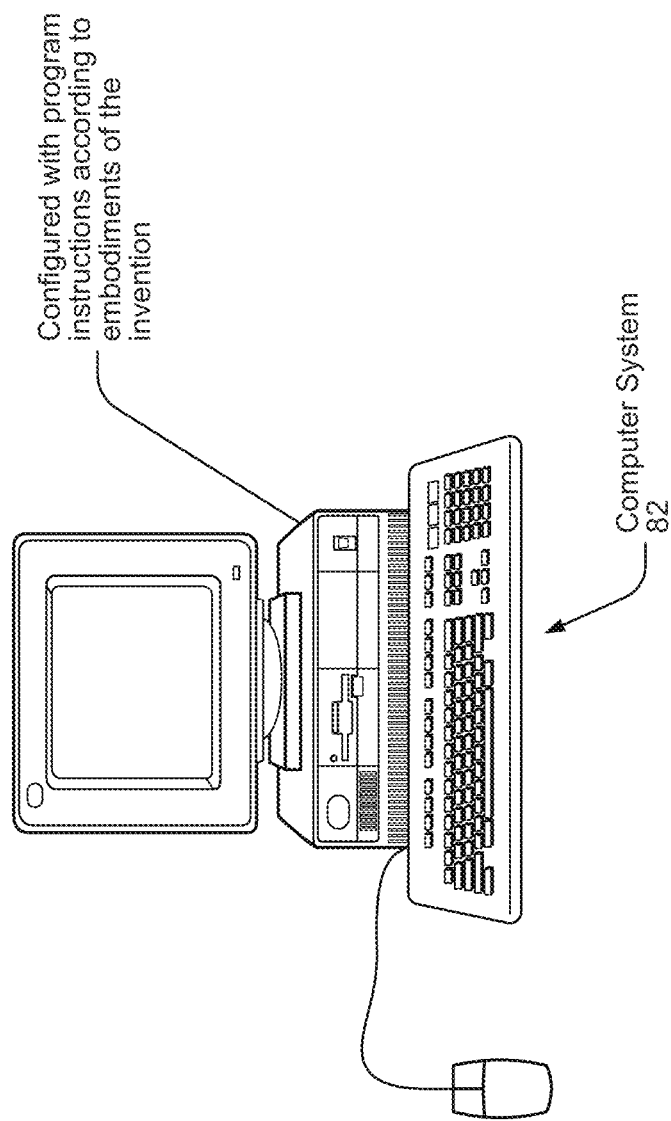
FIG. 2A illustrates a computer system configured to implement embodiments of the present invention.

FIG. 2A—Computer System

FIG. 2A illustrates a computer system 82 configured to implement embodiments of the present invention. As shown in FIG. 2A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform. For example, in some embodiments, the graphical user interface may facilitate user specification and use of logical instruments, as described herein.

The computer system 82 may include at least one memory medium on which one or more computer programs or software components according to one embodiment of the present invention may be stored. For example, the memory medium may store one or more graphical programs which are executable to implement or perform the methods described herein. In some embodiments, the memory medium may store software, e.g., one or more graphical programs, that facilitates user specification and use of logical instruments, as described herein.

Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 2B:
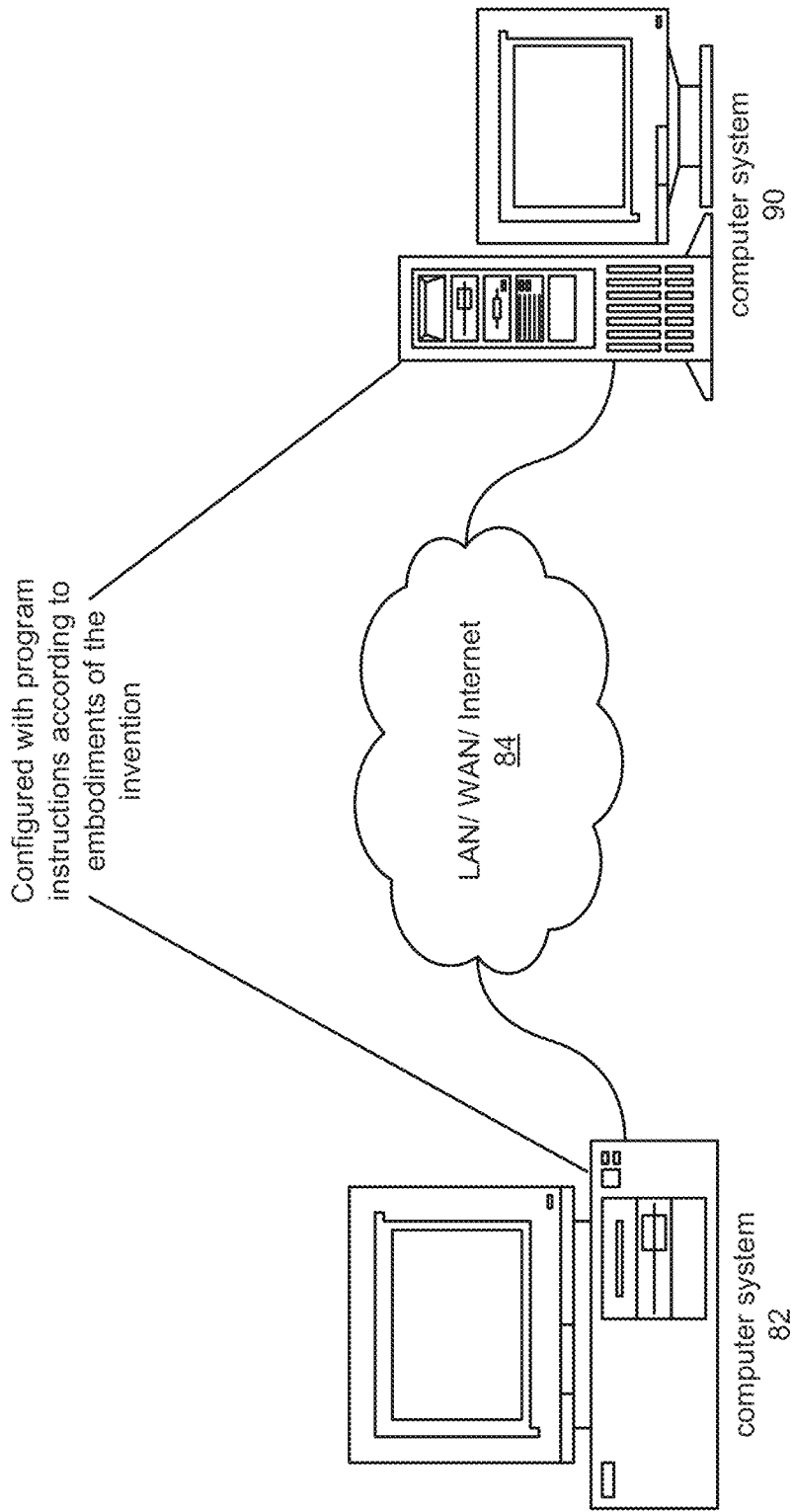
FIG. 2B illustrates a network system comprising two or more computer systems configured to implement embodiments of the present invention.

FIG. 2B—Computer Network

FIG. 2B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Figure 2C:
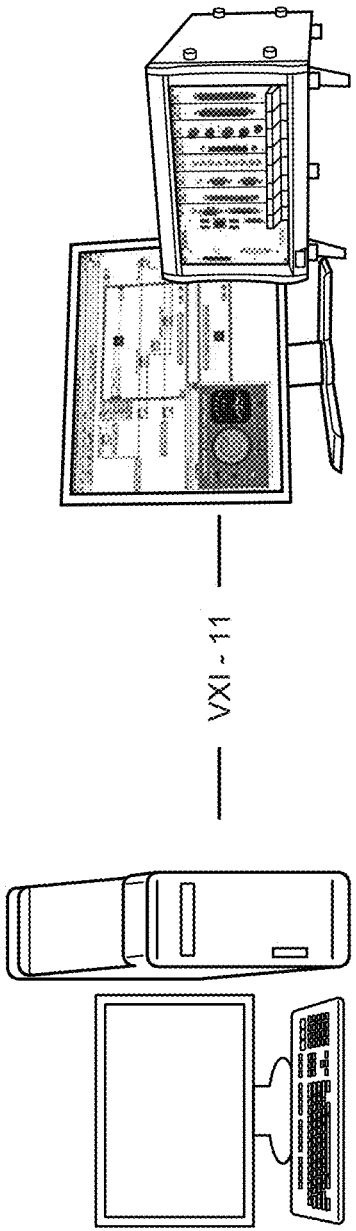
FIG. 2C illustrates a distributed measurement system, according to one exemplary embodiment of the invention.

FIG. 2C—Distributed Measurement System

FIG. 2C illustrates a distributed measurement system configured according to embodiments of the present invention. As may be seen, this exemplary system includes a custom modular measurement (or instrumentation) system, in this case, a PXI (PCI (Peripheral Component Interconnect) Extensions for Instrumentation) system, that includes a chassis with multiple installed hardware devices (boards or modules) and a display. Note that while the instrumentation system shown utilizes PXI, any other instrumentation platforms may be used as desired. The PXI system is communicatively coupled to a client computer, e.g., a personal computer, although other types of suitably configured computer may be used as desired, e.g., a workstation, a laptop computer, a tablet computer, and so forth.

As indicated, in this particular exemplary embodiment, the client computer and PXI system communicate via an VXI-11 instrumentation protocol bus, although it should be noted that any other instrumentation protocols may be used as desired, e.g., GPIB (General Purpose Interface Bus) or HiSLIP (High Speed LAN (local area network) Instrument Protocol), among others.

As FIG. 2C also shows, in this embodiment, the client computer includes test executive software, such as, for example, TestStand™ testing software provided by National Instruments Corporation, the LabVIEW™ graphical program development environment, also provided by National Instruments Corporation, and support for various programming languages, such as C, C#, Python, Ruby, and JavaScript, among others. As further indicated, in some embodiments, the client computer may also include or support virtual instrument related software, such as NI-VISA (National Instruments Virtual Instrument Software Architecture, which is a standard for configuring, programming, and troubleshooting instrumentation systems comprising GPIB, VXI, PXI, Serial, Ethernet, and/or USB interfaces. As also shown, the client computer may also include a set of commands and responses, e.g., SCPI (Standard Commands for Programmable Instruments) commands and responses, although other command sets and protocols may be used as desired.

As also shown, in the embodiment of FIG. 2C, the PXI (or more generally, instrumentation) system includes a remote interface for logical instruments (RILI) system definition, e.g., in the form of user code and XML (eXtensible Markup Language), although other languages may be used as desired. The instrumentation system also includes a RILI run-time system or engine, described in more detail below, as well as a LabVIEW™ run-time system or engine, as provided by National Instruments. It should be noted, however, that the various specific protocols, systems, engines, languages, devices, and so forth, used in the examples and descriptions presented herein, are exemplary only, and are not intended to limit embodiments of the present techniques to any particular protocols, systems, engines, languages, or devices.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
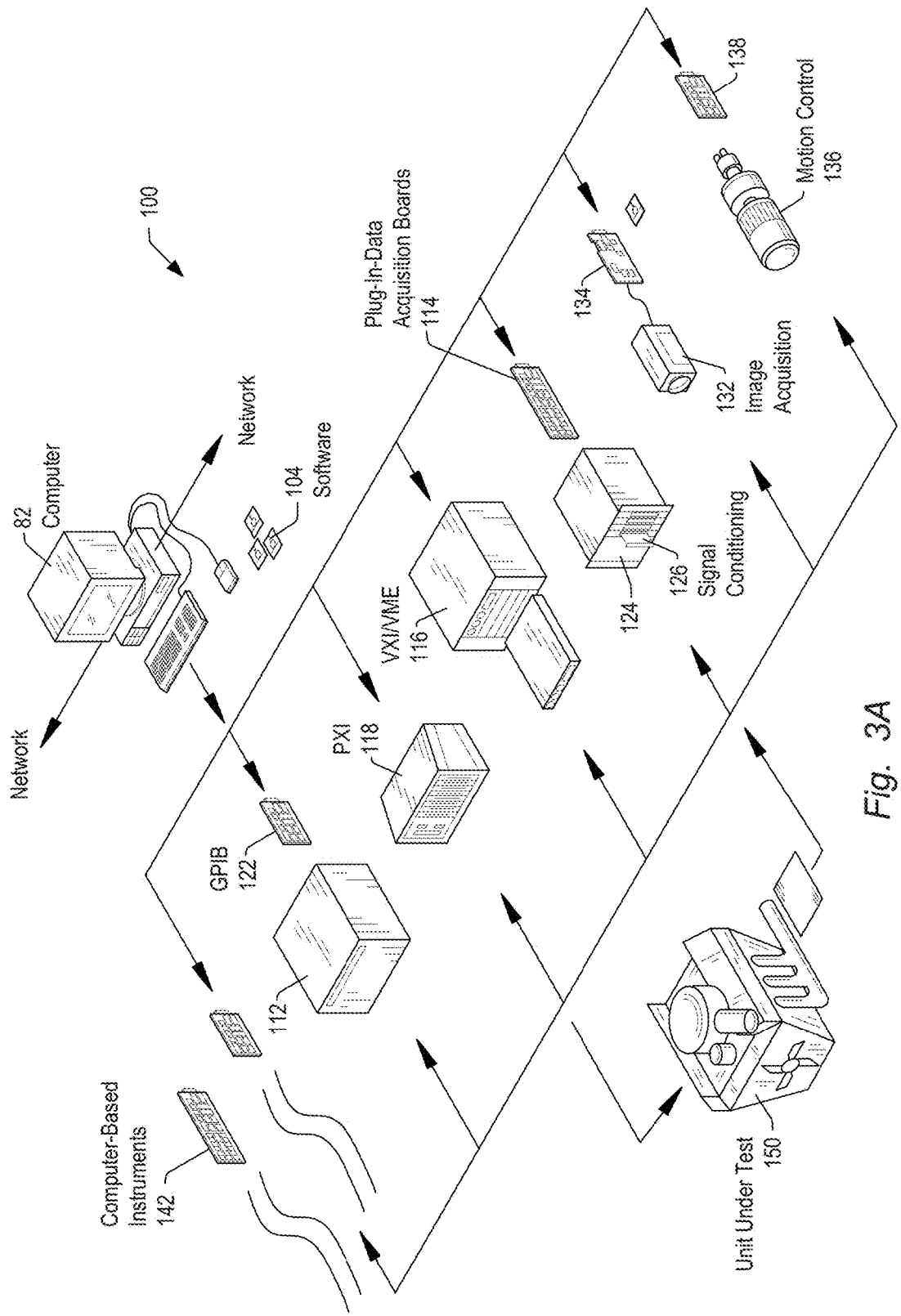
FIG. 3A illustrates an instrumentation control system according to one embodiment of the invention.

FIG. 3A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
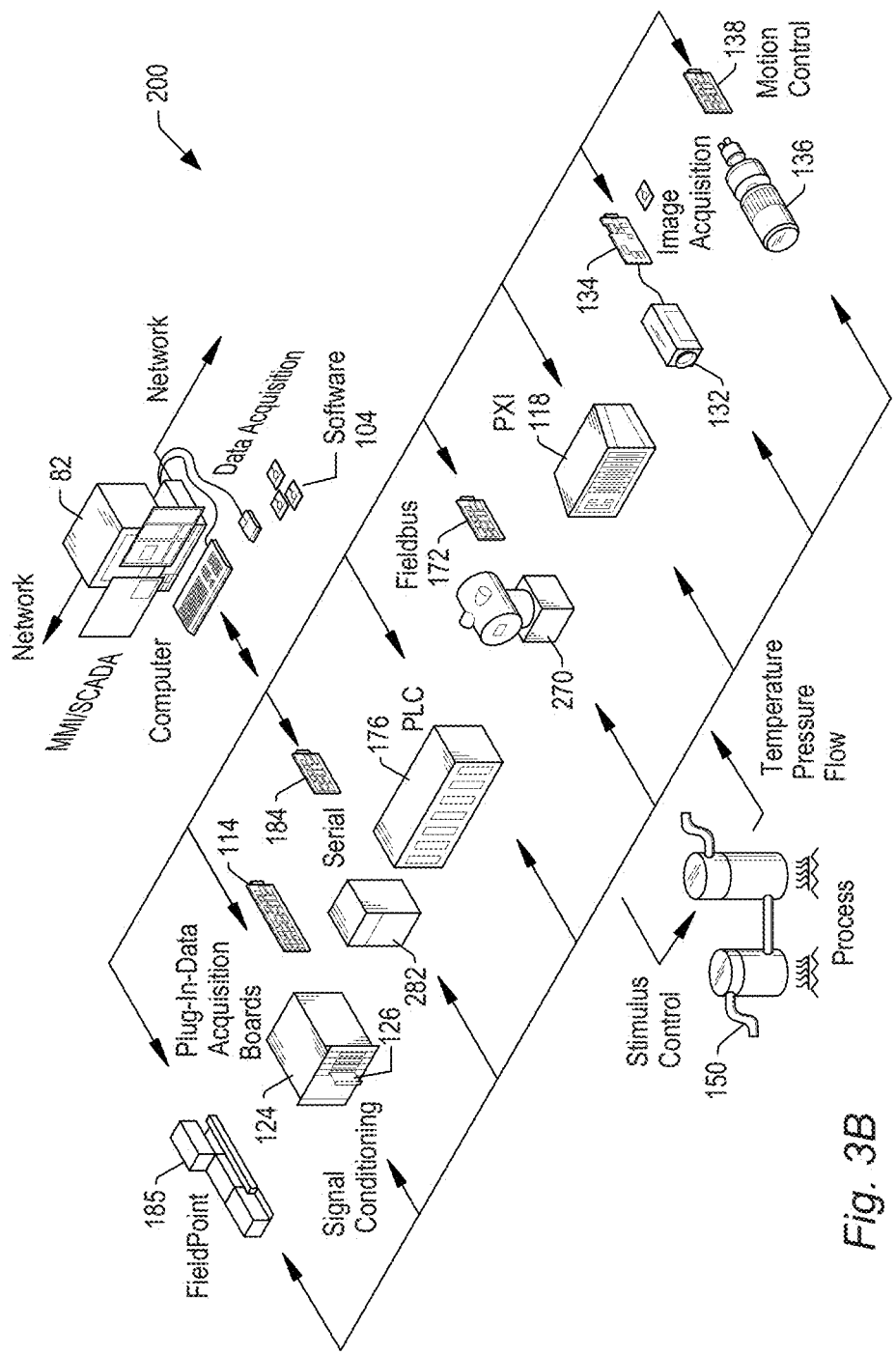
FIG. 3B illustrates an industrial automation system according to one embodiment of the invention.

FIG. 3B illustrates an exemplary industrial automation system 200 which may implement embodiments of the invention. The industrial automation system 200 is similar to the instrumentation or test and measurement system 100 shown in FIG. 3A. Elements which are similar or identical to elements in FIG. 3A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 4A:
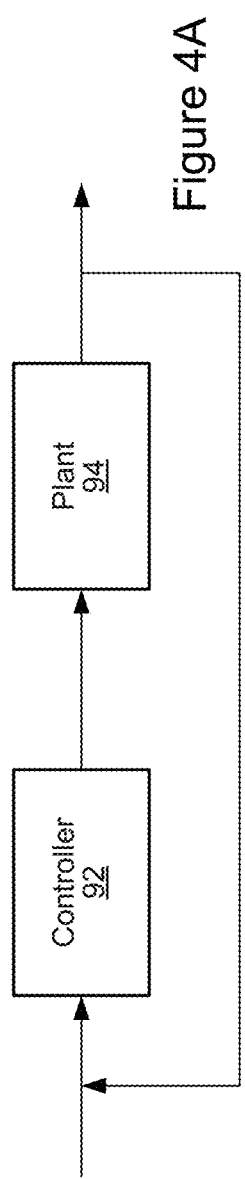
FIG. 4A is a high level block diagram of an exemplary system which may execute or utilize graphical programs.

FIG. 4A is a high level block diagram of an exemplary system which may execute or utilize graphical programs. FIG. 4A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 4B:
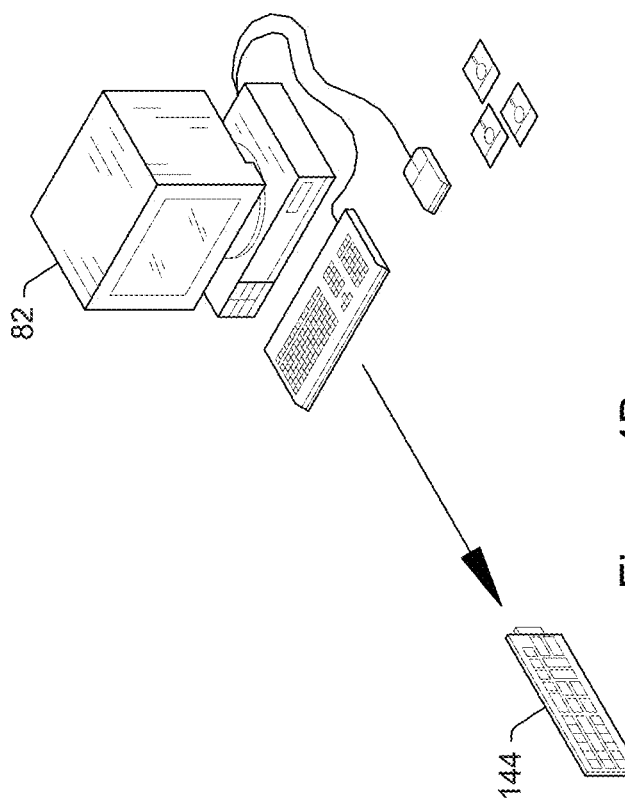
FIG. 4B illustrates an exemplary system which may perform control and/or simulation functions utilizing graphical programs.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 3A, 3B, and 4B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 3A and 3B, may be referred to as virtual instruments.

Figure 5:
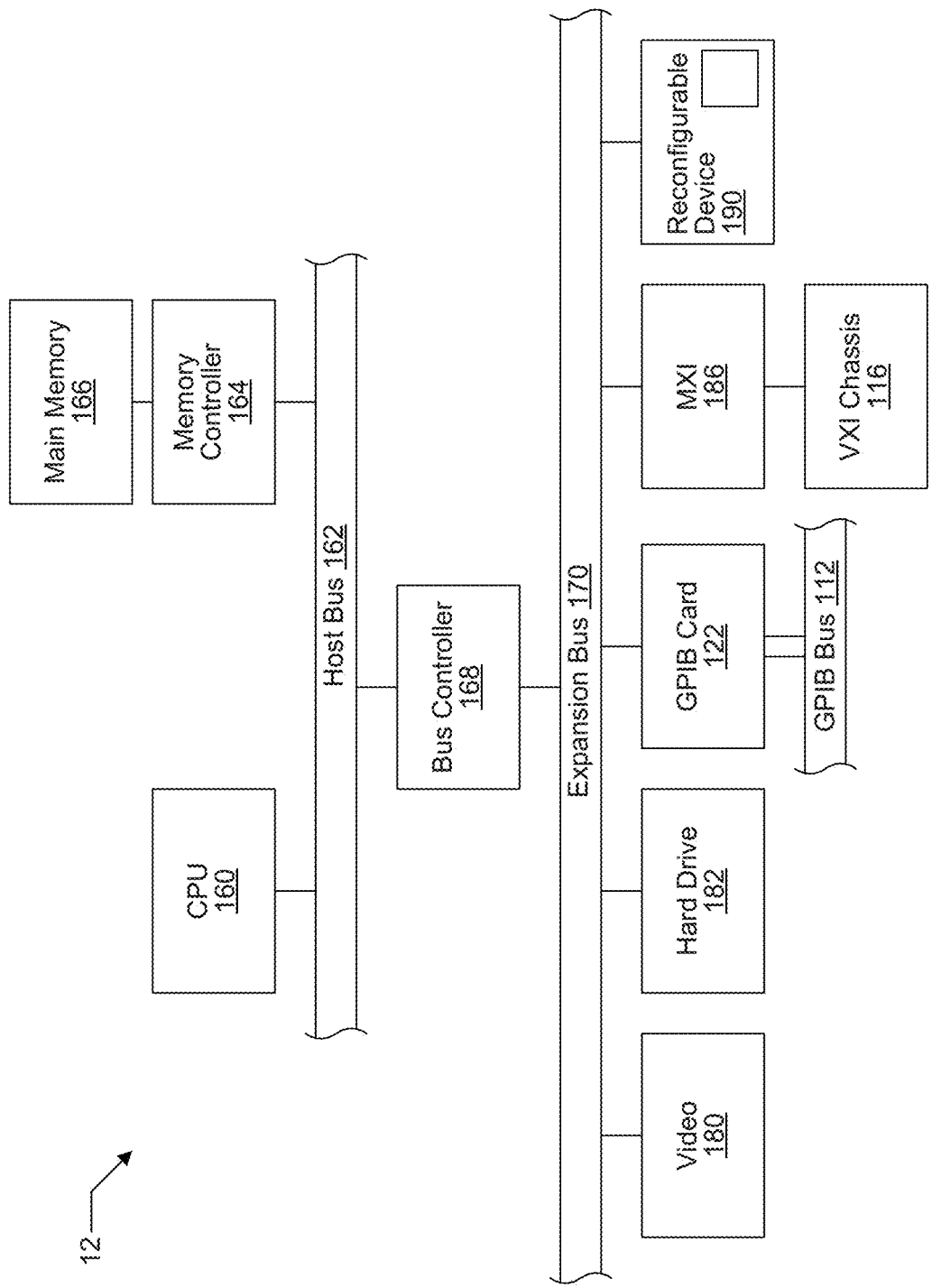
FIG. 5 is an exemplary block diagram of the computer systems of FIGS. 2A, 2B, 3A and 3B and 4B.

FIG. 5—Computer System Block Diagram

FIG. 5 is a block diagram 12 representing one embodiment of the computer system 82 and/or 90 illustrated in FIGS. 2A, 2B, 2C, or computer system 82 shown in FIG. 3A or 3B. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store programs, e.g., graphical programs, implementing embodiments of the present techniques. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 6:
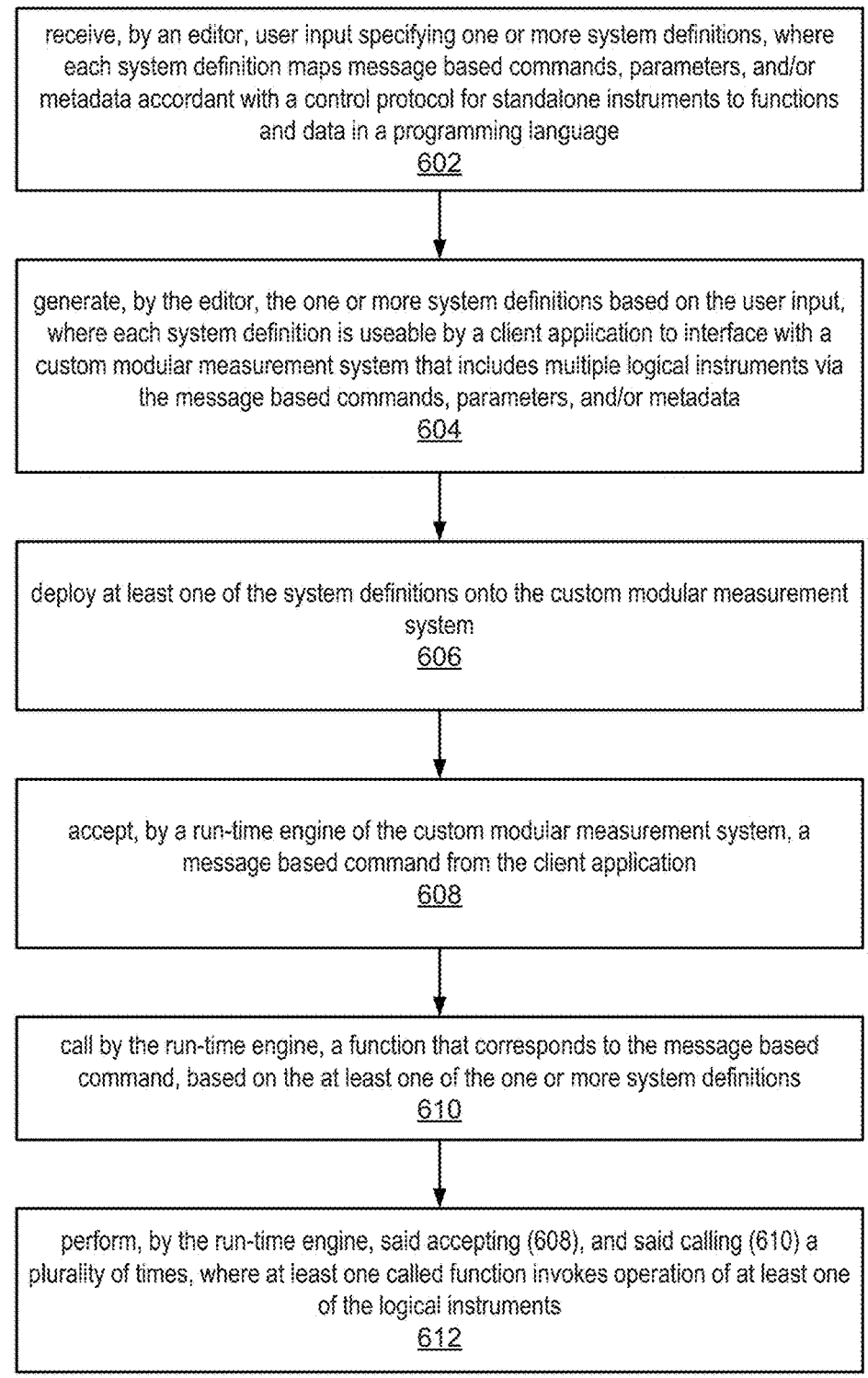
FIG. 6 is a flowchart diagram illustrating one embodiment of a method for interfacing with logical instruments.

FIG. 6—Flowchart of a Method for Interfacing with Logical Instruments

FIG. 6 illustrates a method for interfacing with logical instruments, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, user input specifying one or more system definitions may be received by an editor, e.g., an editor program executing on a computer, such as a computer system 82 or 90, or a client computer as shown in FIG. 2C. Each system definition may map message based commands, parameters, variables and/or metadata accordant with a control protocol for standalone instruments to functions and data in a programming language, e.g., the "G" graphical programming language of LabVIEW™, or any other programming language desired. Note that as used herein the term "standalone instrument" refers to a traditional standalone hardware device, such as an oscilloscope, signal analyzer, etc. Thus, each system definition may map message based standalone instrument communications (commands, parameters, variables, and/or metadata) to function calls in a programming language.

In 604, the one or more system definitions may be generated by the editor, based on the user input of 602. Each system definition may be useable by a client application to interface with a custom modular measurement system that includes multiple logical instruments via the message based commands, parameters, variable, and/or metadata. Said another way, a client application may utilize message based standalone instrument communications (the message based commands, parameters, variables, and/or metadata) to interact with logical instruments of the custom modular measurement system via the mappings provided by the one or more of the system definitions. As noted above in the Terms section, a logical instrument is a software implemented instrument that provides custom measurement and/or analysis functionality to extend or enhance the capability of utilized measurement hardware. Logical instruments implemented on an embedded device may be referred to as embedded logical instruments.

Figure 7:
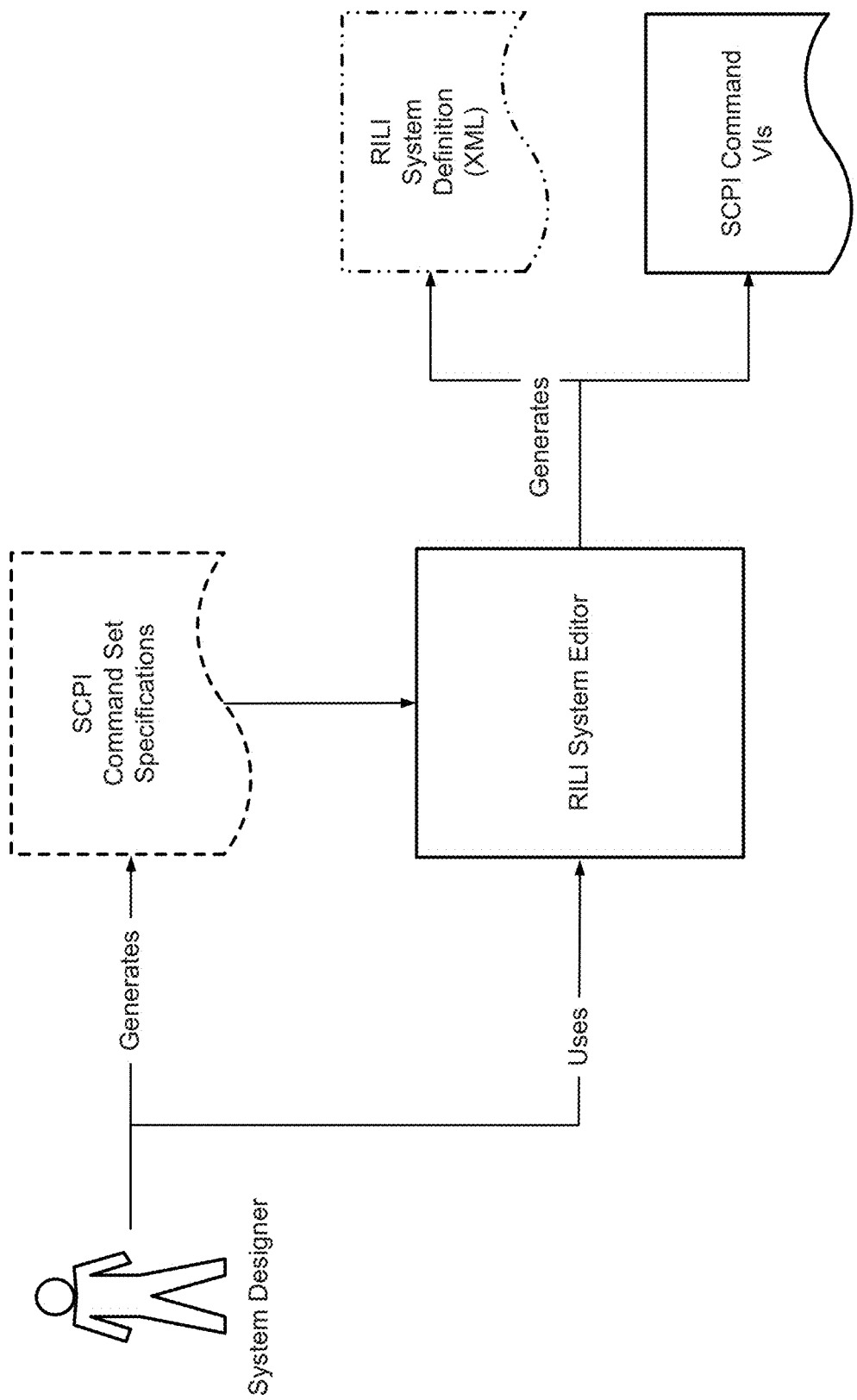
FIG. 7 illustrates an exemplary edit time work flow, according to one embodiment.

FIG. 7 illustrates an exemplary edit time work flow, according to one embodiment. As shown, a system designer (user of the editor of 602) may specify or generate command set specifications (as per 602), in this particular case, SCPI (Standard Commands for Programmable Instruments) command set specifications, via input to a RILI (remote interface for logical instruments) system editor, although it should be noted that this name is used for convenience and informative purposes only, and that any other name may be used as desired. More generally, the names and labels used herein are exemplary only, and are not intended to limit the embodiments to any particular form, function, or appearance. As FIG. 7 also shows, the editor (RILI system editor) may then generate at least one system definition, in this exemplary case, at least one RILI system definition in XML, although any other language or format may be used as desired. As indicated, in some embodiments, the editor may also generate command programs, e.g., in response to input from the system designer. In the exemplary embodiment of FIG. 7, the command programs are SCPI command VIs (virtual instruments, e.g., graphical programs). These command programs may implement functionality corresponding to associated commands, i.e., may be executable to perform functions in response to respective commands. Accordingly, in some embodiments, the control protocol for standalone instruments may be or include SCPI (Standard Commands for Programmable Instruments).

Thus, in some embodiments, the method may include displaying and editing, by the editor, one or more functions in the programming language. In various embodiments, the programming language may be of any type desired. For example, in one embodiment, the programming language may be textual, e.g., C, C++, C#, JAVA, etc., while in other embodiments, the programming language may be or include a graphical programming language. In one embodiment, the graphical programming language may be a graphical data flow programming language. For example, the editor may be part of a graphical program development environment, such as LabVIEW™, whereby the user may develop functions in the LabVIEW™ graphical programming language ("G").

Figure 8:
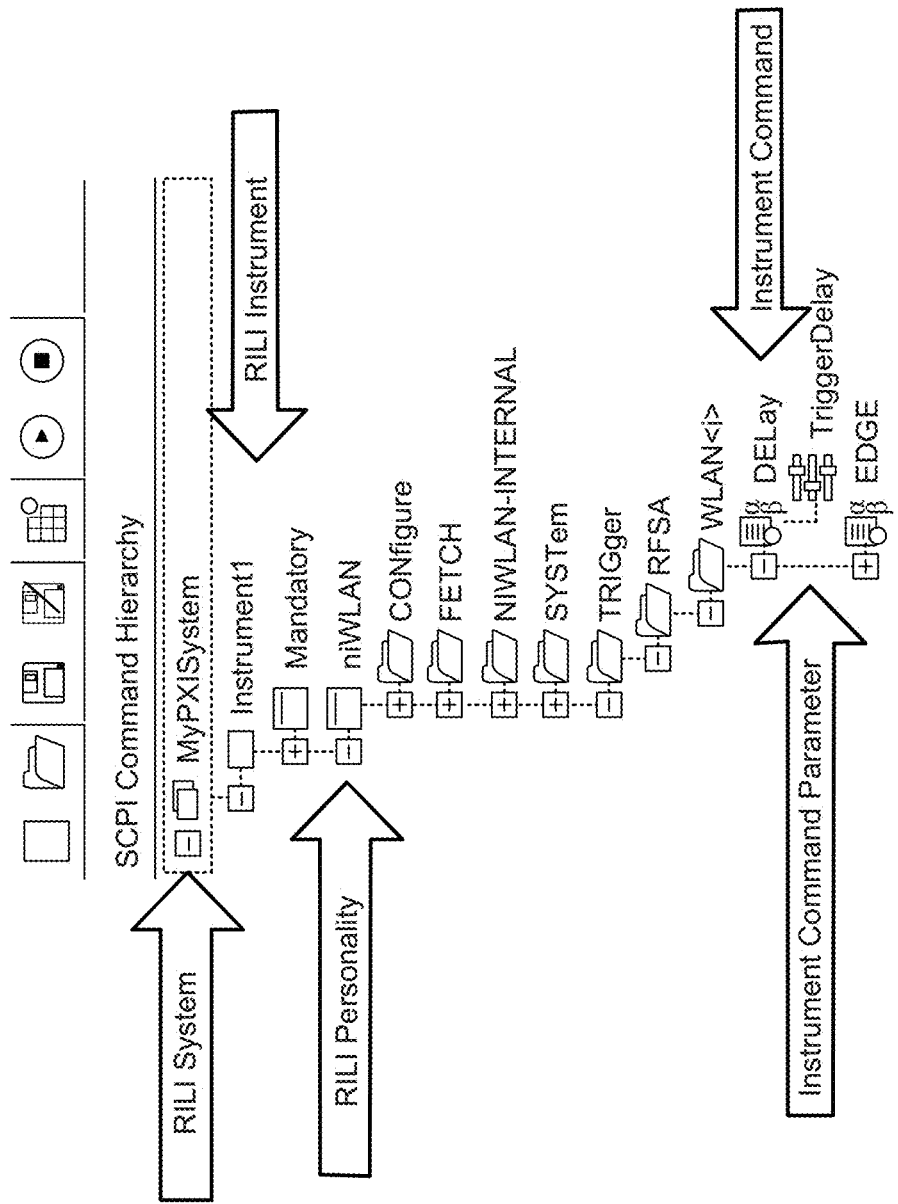
FIG. 8 illustrates an exemplary hierarchical command set definition, according to one embodiment.

Similarly, in some embodiments, the method may include displaying and editing, by the editor, at least one of the system definitions in response to user input. Turning now to FIG. 8, an exemplary hierarchical command set definition, according to one embodiment, is presented. The hierarchical command set definition may be displayed by the editor in a GUI, via which the system designer may create and edit such definitions. For example, in one embodiment, a tree of the message based commands organized in accordance with the logical instruments and measurement subsystems of the logical instruments may be created by the editor in response to input, as illustrated in FIG. 8.

As with FIG. 7, this exemplary embodiment is based on SCPI. As indicated, at the top level of the hierarchy is the RILI system designation, under which follows a defined RILI instrument (Instrument 1) with component folders: "Mandatory" and "niWLAN", which include necessary (mandatory) definitions for the instrument, and a "RILI personality" or profile definition with network related aspects, respectively. Each of these specification components may include subcomponents. For example, as shown, the niWLAN RILI personality may include definition folders, e.g., "CONfigure", "FETCH", "NIWLAN-INTERNAL", "SYSTem", and "TRIGger", defining respective commands or aspects of the RILI personality, although these particular names are exemplary only. Further illustrating the hierarchical nature of the system definition, the trigger related personality definition (folder) "TRIGger" includes subfolder "RFSA" (radio frequency signal analyzer) with subfolder "WLAN<i>" that defines an instrument command: "DELay", specifically, an instrument command parameter definition: TriggerDelay, and an "EDGE" definition that specifies which edge of a trigger signal is used as a trigger. Note that the hierarchical command set definition of FIG. 7 is exemplary only, and that the hierarchy and particular components shown are for illustrative purposes.

Thus, the at least one system definition may specify or define a command set for interacting with logical instruments implemented in the custom modular measurement system. Moreover, the system designer may also at least partially specify or define logical instruments for the custom modular measurement system, e.g., via user code (e.g., command programs or VIs). Note that in various embodiments, each logical instrument may represent one or more of: a single physical measurement device (e.g., physical module or card), multiple coordinated physical measurement devices, or software, e.g., an instrument program.

In one embodiment, an integrated instrument soft front panel may be created by the editor, e.g., in response to user input, and/or based on the at least one system definition. The integrated instrument soft front panel may include respective subpanels for logical instruments and/or measurement subsystems of the logical instruments, and may map elements on the panels to the functions, parameters, variables, and/or metadata in the programming language. Thus, a GUI for the defined system may be generated by the editor. In some embodiments, the GUI may be created in accordance with the Soft Front Panel (SFP) protocol or system provided by National Instruments Corporation.

In some embodiments, the editor may create variables scoped into isolated groups for storing data accessible from command functions, e.g., from the SCPI command functions. This scope partitioning of variables may prevent memory collisions or conflicts during operation of the logical instruments.

Method elements 606-612 describe exemplary run-time related operations of the present techniques.

In 606, at least one of the system definitions may be deployed onto the custom modular measurement system (see, e.g., the PXI system of FIG. 2C). In some embodiments, multiple such system definitions may be deployed onto the custom modular measurement system. Once this (at least one) system definition is deployed to the custom modular measurement system, the system may be operational, assuming that the system is already configured appropriately with the necessary run-time components, e.g., a run-time engine, e.g., a RILI run-time engine, etc.

Figure 9:
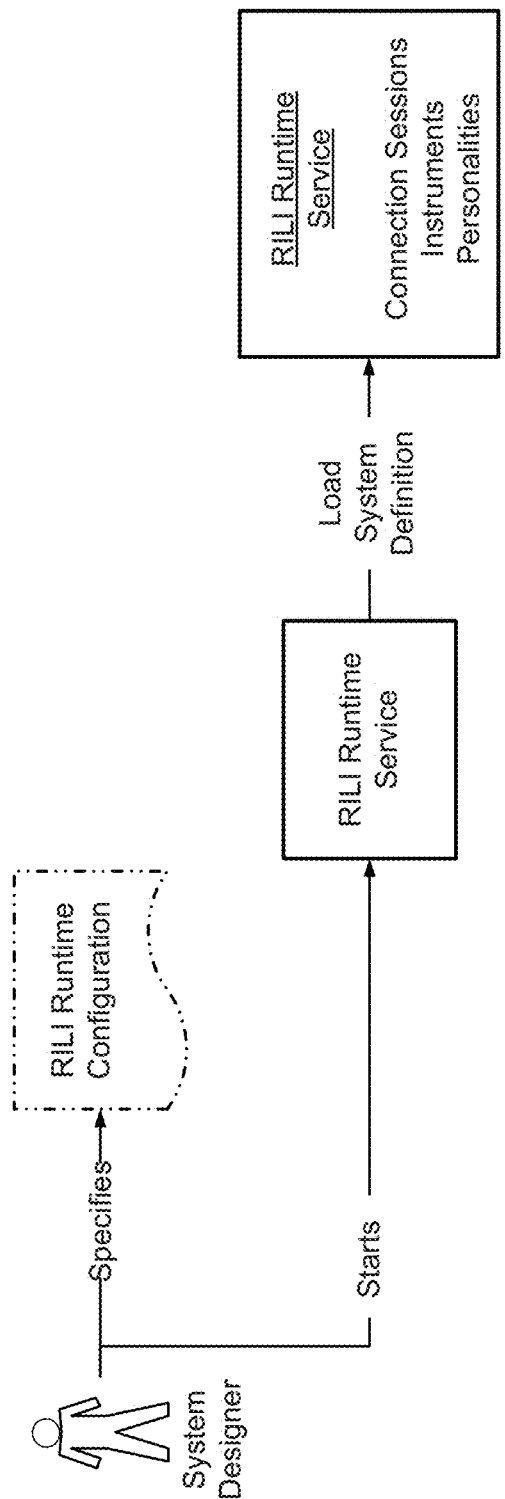
FIG. 9 illustrates an exemplary run time work flow, according to one embodiment.

FIG. 9 illustrates an exemplary run time work flow, according to one embodiment. As may be seen, a system designer, possibly the same system designer of 602, may specify (or update) a runtime configuration for the custom modular measurement system, e.g., a RILI runtime configuration, e.g., via user input to a GUI, and may initiate a runtime service for the custom modular measurement system, e.g., a RILI runtime service. This runtime service may then load the at least one system definition (606), thereby configuring the runtime service, e.g., with specified connection sessions, (logical) instruments, and personalities (or profiles). At this point, the custom modular measurement system may be ready for operation.

In 608, a message based command from the client application may be accepted by a run-time engine of the custom modular measurement system (e.g., the RILI run-time engine—again, see the PXI system of FIG. 2C). For example, referring again to the exemplary system of FIG. 2C, the message based command may be sent from the client computer based on a client application executing on the client computer, and may be transmitted in accordance with a specified instrumentation protocol, such as VXI-11.

In 610, a function that corresponds to the message based command may be called by the run-time engine, based on the at least one of the one or more system definitions. In other words, the method may use the at least one system definition to convert or translate the message based command into a function call by the run-time engine.

In 612, the accepting (608) and calling (610) may be performed by the run-time engine a plurality of times, where at least one called function invokes operation of at least one of the logical instruments. Said another way, method elements 608 and 610 may be repeated one or more times in an iterative manner, mapping the accepted message based commands to functions that are called by the run-time engine, where at least one of the functions utilizes at least one of the logical instruments. In some embodiments, the method may further include sending a message containing a result of the operation to the client application. In other words, once the at least one of the logical instruments is invoked, the method may send a message that includes results of the logical instrument's operation, e.g., to another system or process, to a log file, to a user, etc.

In some embodiments, the message based command may be parsed by the run-time engine, and the (corresponding) function may be determined based on the parsing. The function call of 610 may be performed in response to this determining.

In one embodiment, the method may further include synchronizing, by the run-time engine, access to a physical measurement device by multiple logical instruments, or multiple measurement subsystems within a logical instrument. In this manner, operations or functions performed by multiple logical instruments or measurement subsystems thereof may be coordinated to perform a higher level collective task, i.e., to achieve some collective functionality.

Exemplary System Architectures

Figure 10:
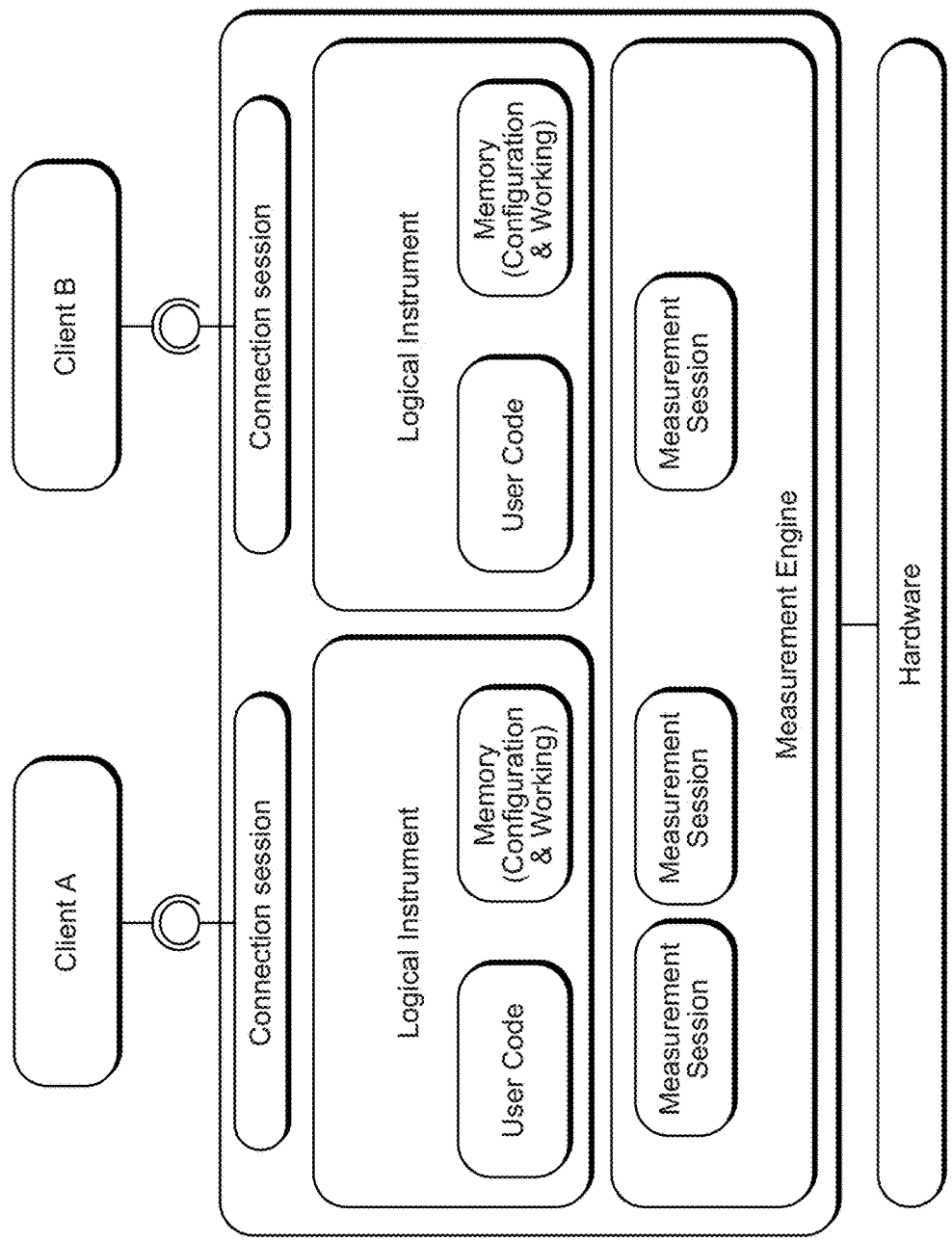
FIG. 10 is a high level block diagram of an exemplary system of logical instruments, according to one embodiment.
Figure 11:
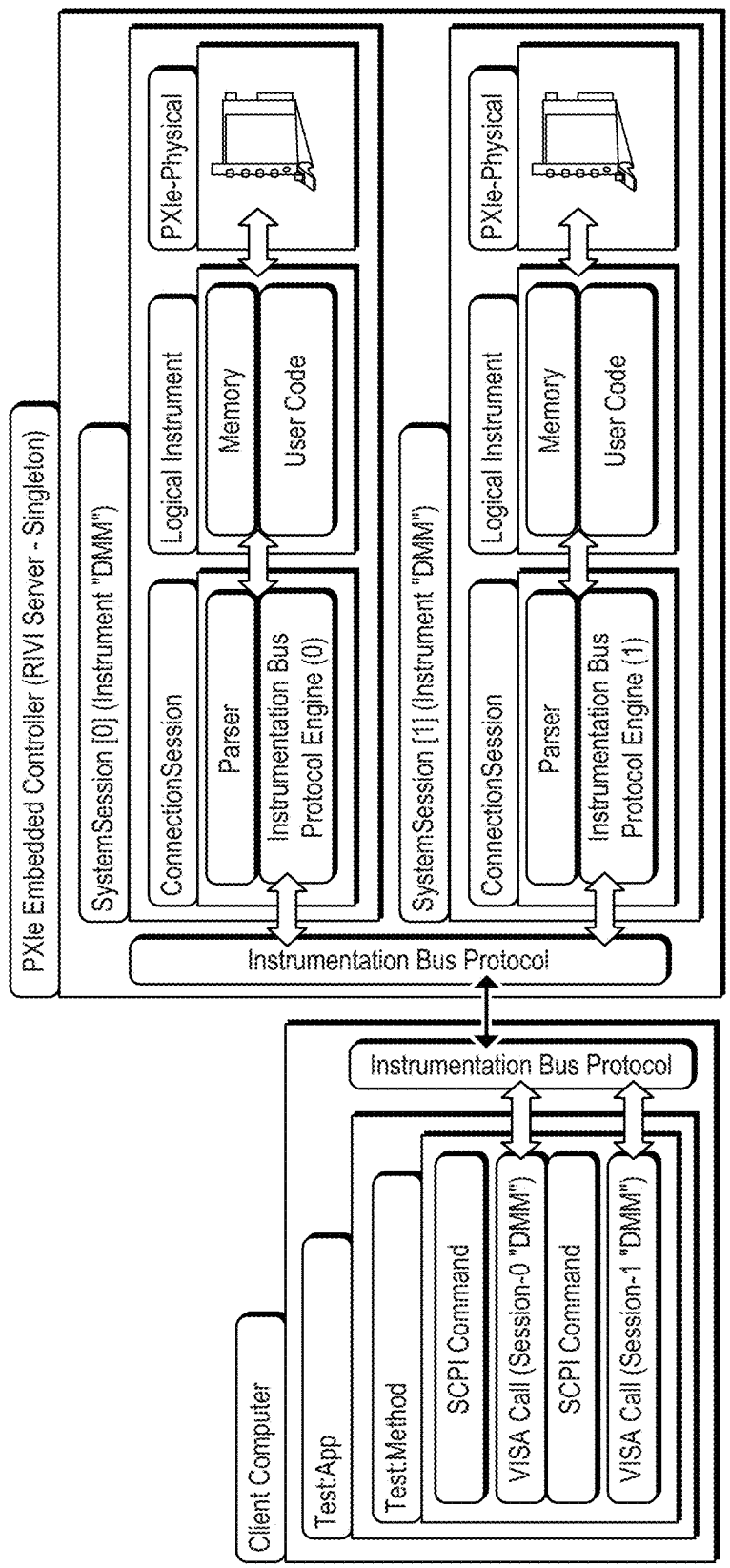
FIG. 11 illustrates an exemplary internal architecture of an exemplary system of logical instruments and shared hardware, according to one embodiment.

FIGS. 10 and 11 illustrate exemplary system designs and architectures, according to some embodiments. Note, however, that the particular designs and architectures shown and described are exemplary only. The system may be implemented via any of the devices shown in the Figures described above, and may thus include a processor and a memory coupled to the processor, where the memory stores program instructions executable to implement a plurality of logical instruments, where each logical instrument is configured to perform measurement functions via at least one corresponding physical measurement device. The program instructions may be further executable to implement a plurality of isolated memory spaces in the memory, where each isolated memory space is configured to store configuration information and working data for a respective logical instrument, and may further be executable to implement at least one measurement engine.

Per the Terms section above, a measurement engine is an application programming interface (API) to hardware that the logical instrument uses to control or otherwise access measurement hardware. Examples of measurement engines include, but are not limited to, device driver programs such as NI DAQmx (National Instruments data acquisition multi-function software services) and NI RFSA (National Instruments radio frequency signal analyzer) driver programs, among others. In some embodiments, the system may include a plurality of measurement engines. Moreover, the plurality of measurement engines may be configured to operate concurrently, as discussed below in more detail.

The plurality of logical instruments may be configured to operate concurrently. For example, each of the plurality of logical instruments may be configured to: communicate with a respective client application independently, and acquire, generate, or process data using the at least one corresponding physical measurement device via the at least one measurement engine per the configuration information. Moreover, as noted above, during operation, at least two of the logical instruments may share use of a single physical measurement device.

FIG. 10 is a high level block diagram of an exemplary system of logical instruments, according to one embodiment. As FIG. 10 illustrates, the system of logical instruments may include multiple connection sessions, each connection session facilitating interaction of a respective client (application), e.g., Client A and Client B of FIG. 10, with a respective logical instrument, as presented below each connection session. As used herein, the term "connection session" is a collection of state information, stored in hardware and/or in software, associated with a connection of a client application to an instance of a logical instrument.

As FIG. 10 shows, in one embodiment, each logical instrument may include user code, e.g., one or more programs implementing functionality of the logical instrument, and respective memory, including configuration memory for storing configuration data, and working memory for use by the logical instrument (user code) in performing functions. As noted above, the system may also include a measurement engine, also shown in FIG. 10, which may include one or more device driver programs for interacting with hardware, also shown, where the hardware includes at least one physical measurement device, and in some embodiments, multiple such devices. As further indicated in FIG. 10, in some embodiments, the measurement engine may include or support multiple measurement sessions. A measurement session is or includes a collection of state information, stored in hardware and/or in software, associated with a connection of a logical instrument to a physical measurement device. Thus, the system may be configured to implement and manage interactions between multiple logical instruments and associated physical measurement devices independently, based on these measurement sessions.

Moreover, in some embodiments, the plurality of logical instruments may be configured to operate concurrently. For example, each of the plurality of logical instruments may be configured to communicate with a respective client application independently, and acquire, generate, or process data using the at least one corresponding physical measurement device via the at least one measurement engine per the configuration information. During operation, at least two of the logical instruments may share use of a single physical measurement device, as discussed in more detail below.

FIG. 11 illustrates an exemplary internal architecture of an exemplary system of logical instruments and shared hardware, according to one embodiment. More specifically, FIG. 11 describes a more detailed (exemplary) embodiment of the system of FIG. 10.

As shown, in the exemplary embodiment of FIG. 11, a client computer is coupled to a custom modular measurement device that includes multiple logical instruments and corresponding physical measurement devices, in this exemplary case, PXIe modules or boards (labeled "PXIe-Physical"), comprised in a chassis, e.g., as illustrated in FIG. 2C.

The client computer of FIG. 11 includes a test application (Test:App), that includes at least one method, where the method includes or utilizes one or more SCPI commands and corresponding VISA calls, which may communicate with the controller via an instrumentation bus protocol, e.g., VXI-11, as shown. In other words, the client application may execute on the client computer, and may invoke one or more methods (e.g., program functions) that send SCPI commands via VISA calls (e.g., in the form of messages) to the controller (or, more generally, the custom modular measurement system).

As FIG. 11 further illustrates, the system may implement multiple system sessions, where each system session is a collection of state information, stored in hardware and/or in software, associated with an instance of a logical instrument. A system session facilitates multiple clients interacting with multiple instances of the same logical instrument. Each system session may include or support a respective connection session, logical instrument, and physical measurement device, as shown.

In one embodiment, each connection session may include a parser, which is a component that analyzes a string containing one or more instrumentation commands and corresponding parameters, received from a client application, e.g., via an instrument bus, and maps the instrumentation commands and parameters to memory and actions of logical instruments. Each connection session may include an instrumentation bus protocol engine for communicating with the client computer via the instrument bus protocol, e.g., VXI-11, among others.

Each connection session may be configured to communicate with a respective logical instrument, specifically, the respective memory and user code of the logical instrument, which in turn, may communicate with respective hardware, e.g., with a respective physical measurement device, such as a measurement module or board. In some embodiments, at least one logical instrument of the plurality of logical instruments may be configured to provide measurement capabilities, and analysis functionality implemented in software, where the analysis functionality operates on data obtained from the at least one corresponding physical measurement device.

Further Exemplary Embodiments

The following describes further exemplary embodiments of the above techniques.

In one embodiment, during operation, at least two of the logical instruments share use of a single physical measurement device. In other words, multiple logical instruments may utilize the same physical measurement device to perform their respective functions or tasks. For example, in one embodiment, use of a single physical measurement device by a logical instrument may include operating the single physical measurement device in a plurality of phases, including at least one phase that includes a portion that requires exclusive access to the single physical measurement device (i.e., an exclusive portion), which may be referred to as an exclusive portion of the phase. Accordingly, to share use of the single physical measurement device, each logical instrument may configured to lock the single physical measurement device for duration of the exclusive portion of the at least one phase, thereby blocking other logical instruments from using the single physical measurement device for the duration of the exclusive portion of the at least one phase, and unlock the single physical measurement device when the exclusive portion of the at least one phase completes, thereby allowing use of the single physical measurement device by the other logical instruments. For brevity, the "exclusive portion of the at least one phase" may be referred to herein as simply the "exclusive portion".

For example, in one embodiment, the exclusive portion may be or include an acquire portion of a measure phase, in which data are acquired via the corresponding single physical measurement device. In another embodiment, the exclusive portion may be or include a generate portion of a measure phase, in which signals are generated via the corresponding single physical measurement device. Note that the particular phase and portion names used herein are exemplary only, and that any other names may be used as desired.

Figure 12:
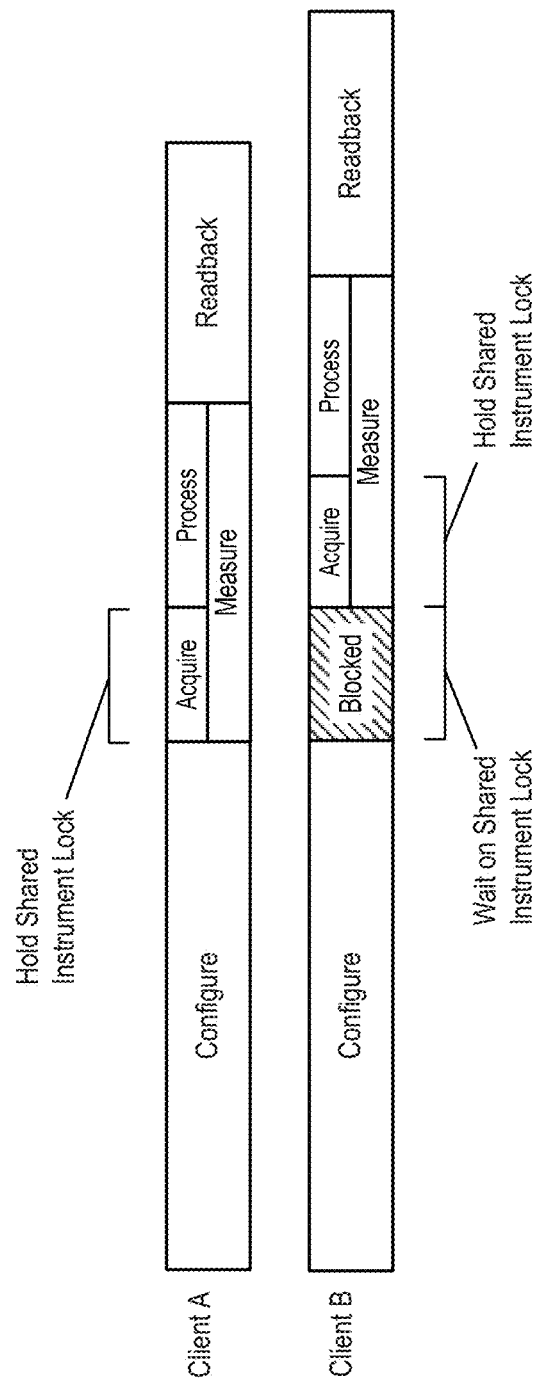
FIG. 12 illustrates sharing of a physical instrument, according to one embodiment.

FIG. 12 illustrates exemplary sharing of a physical instrument via timelines, according to one embodiment. In this case, the single physical measurement device is a DAQ device. As indicated, Client A (e.g., a first client application) may invoke a measurement function or operation that uses a shared physical measurement device in multiple phases, including a configure phase, a measure phase, which includes an acquire phase and a process phase, and finally, a readback phase. In this exemplary case, the exclusive portion of the at least one phase (which requires exclusive access to the single physical measurement device) is the acquire portion of the measure phase, in which the single physical measurement device acquires data. Client B (e.g., a second client application) make be configured to use the same device to acquire respective data.

As shown, the single physical measurement device, i.e., the shared instrument, may be locked for use by Client A during the acquire portion of the measure phase (of Client A), as indicated by the notation "Hold Shared Instrument Lock", during which time, Client B's access to the single physical measurement device (shared instrument) may be blocked, as indicated. Thus, Client B may be required to wait until Client A's acquire portion of the measure phase is complete before beginning its own acquire portion of the measure phase, as indicated by the notation "Wait on Shared Instrument Lock".

Once the acquire portion of the measure phase of Client A is complete, the single physical measurement device, i.e., the shared instrument, may be locked for use by Client B for the duration of the acquire portion of the measure phase of Client B, as indicated by the notation "Hold Shared Instrument Lock" below the Client B timeline, during which time, Client B's access to the single physical measurement device (shared instrument) may be blocked, as indicated. Thus, Client A may be excluded from accessing the device until Client B's acquire portion of the measure phase is complete. Thus, each client may be excluded from accessing the single physical measurement device for a minimum duration, specifically, for the minimum amount of time required by the exclusive portion of the corresponding phase of the device's operation.

In some embodiments, each logical instrument may be configured to lock and unlock the single physical measurement device via a mechanism implemented in the at least one measurement engine. For example, the mechanism may be implemented in the at least one measurement engine using operating system (OS) features, e.g., using one or more semaphores, and/or at least one mutex. In some embodiments, the mechanism may be implemented by putting threads to sleep or disabling OS interrupts. In one embodiment, the mechanism may be implemented in the at least one measurement engine using virtual instrument software architecture (VISA) locks.

FIG. 13—Flowchart of a Method for Operating Logical Instruments

FIG. 13 illustrates a method for operating logical instruments, according to one embodiment of the techniques disclosed herein. The method shown in FIG. 13 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1302, a custom modular measurement system may be configured, e.g., using a computer, such as a computer system 82. The custom modular measurement system may include a plurality of logical instruments, where each logical instrument is configured to perform measurement functions via at least one corresponding physical measurement device, and further includes a plurality of isolated memory spaces in the memory, where each isolated memory space is configured to store configuration information and working data for a respective logical instrument, and at least one measurement engine.

Additionally, in some embodiments, the method may further include operating the custom modular measurement system, including operating the plurality of logical instruments concurrently, as indicated in 1304. As also indicated, in some embodiments, this concurrent operation of the logical instruments may include method elements 1312 and 1314. More specifically, each logical instrument of the plurality of logical instruments may communicate with a respective client application independently, as per 1312, and may acquire, generate, or process data using the at least one corresponding physical measurement device via the at least one measurement engine per the configuration information, as indicated in 1314. Moreover, as further indicated in 1304, operating the plurality of logical instruments concurrently may include sharing use of a single physical measurement device by at least two of the logical instruments, as discussed above.

In some embodiments, at least one logical instrument may support concurrent execution of multiple independent measurement subsystems. Thus, for example, a single logical instrument may concurrently perform two complete different and separate measurements. As another example, if a logical instrument includes or supports a measurement system that includes data acquisition functionality via a first measurement subsystem, as well as analysis functionality via a second measurement subsystem, the logical instrument may support concurrent execution of the first and second measurement subsystems, e.g., thereby acquiring data and analyzing the acquired data in concurrent fashion.

In some embodiments, the run-time engine may support multiple concurrent external connections to the same logical instrument. Thus, for example, multiple different client applications or client computers may utilize the same logical instrument, subject to constraints due to exclusive portions of phases associated therewith, as described above.

Thus, embodiments of the above-described techniques may implement a mechanism to export an interface to logical instruments that can be invoked over a network. Moreover, embodiments of the present techniques may facilitate creation of an interface, e.g., a SCPI interface, to a custom modular measurement system, and may provide an associated runtime system that executes functions associated with the commands, possibly concurrently.

Additionally, embodiments of the logical instruments disclosed herein may provide for efficient and cost-effective measurement systems and operations as compared to functionally comparable suites of standalone instruments. For example, by separating logical instruments from the physical hardware they use, the hardware needs to be locked only during the actual exclusive (e.g., acquire or generate) portion of a phase, which means that the only operations that multiple clients cannot perform simultaneously are those performed during the exclusive portion (of the measure phase) of the operation. Embedding such hardware resource management within a shared logical instrument provides substantially more flexibility than prior art approaches.

Summarizing the above, embodiments of the embedded shared logical instruments and related techniques disclosed herein may provide for isolation of clients by providing different connection sessions for each client, may support a virtually unlimited number of logical instrument instances all running on the same physical hardware, may provide isolated memory spaces wherein different clients' configuration values may be stored, one or more measurement engine, with multiple parallel measurement sessions, and in some embodiments, a resource manager, e.g., included in the measurement engine, that implements the above-described locking and unlocking.

Creation of a Graphical Program

The following describes exemplary creation of a graphical program, although it should be noted that the techniques described are exemplary only, and that other approaches to creating graphical programs may be used as desired.

First, a graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In another approach, a graphical user interface or front panel for the graphical program may be created, e.g., in response to user input. The graphical user interface may be created in any of various ways, e.g., depending on the graphical programming development environment used.

A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system, comprising:
a processor; and
a memory, coupled to the processor, wherein the processor is configured to execute program instructions stored on the processor, wherein the program instructions to cause the processor to implement:
a plurality of logical instruments, wherein each logical instrument is configured to perform measurement functions via at least one corresponding physical measurement device;
a plurality of isolated memory spaces in the memory, wherein each isolated memory space is configured to store configuration information and working data for a respective logical instrument; and
at least one measurement engine;
wherein the plurality of logical instruments are configured to operate concurrently, and wherein each of the plurality of logical instruments is configured to:
communicate with a respective client application independently; and
acquire, generate, or process data using the at least one corresponding physical measurement device via the at least one measurement engine per the configuration information; and
wherein during operation, at least two of the logical instruments share use of a single physical measurement device.

2. The system of claim 1, wherein use of a single physical measurement device by a logical instrument comprises operating the single physical measurement device in a plurality of phases, including at least one phase that includes an exclusive portion that requires exclusive access to the single physical measurement device, and wherein to share use of the single physical measurement device, each logical instrument is configured to:
lock the single physical measurement device for duration of the exclusive portion of the at least one phase, thereby blocking other logical instruments from using the single physical measurement device for the duration of the exclusive portion of the at least one phase; and
unlock the single physical measurement device when the exclusive portion of the at least one phase completes, thereby allowing use of the single physical measurement device by the other logical instruments.

3. The system of claim 2, wherein the exclusive portion of the at least one phase comprises an acquire portion in which data are acquired via the corresponding single physical measurement device.

4. The system of claim 2, wherein the exclusive portion of the at least one phase comprises a generate portion in which signals are generated via the corresponding single physical measurement device.

5. The system of claim 1, wherein the at least one measurement engine comprises a plurality of measurement engines.

6. The system of claim 5, wherein the plurality of measurement engines are configured to operate concurrently.

7. The system of claim 1, wherein each logical instrument is configured to lock and unlock the single physical measurement device via a mechanism implemented in the at least one measurement engine.

8. The system of claim 7, wherein the mechanism is implemented in the at least one measurement engine using operating system (OS) features.

9. The system of claim 8, wherein the operating system (OS) features comprise one or more of:
one or more semaphores; or
at least one mutex.

10. The system of claim 7, wherein the mechanism is implemented in the at least one measurement engine using virtual instrument software architecture (VISA) locks.

11. The system of claim 7, wherein the mechanism is implemented by putting threads to sleep or disabling OS interrupts.

12. The system of claim 1, wherein at least one logical instrument of the plurality of logical instruments is configured to provide:
measurement capabilities; and
analysis functionality implemented in software, wherein the analysis functionality operates on data obtained from the at least one corresponding physical measurement device.

13. A method, comprising:
configuring a custom modular measurement system, the custom modular measurement system comprising:
a plurality of logical instruments, wherein each logical instrument is configured to perform measurement functions via at least one corresponding physical measurement device;
a plurality of isolated memory spaces in the memory, wherein each isolated memory space is configured to store configuration information and working data for a respective logical instrument; and
at least one measurement engine;
operating the custom modular measurement system, comprising:
operating the plurality of logical instruments concurrently, comprising:
for each logical instrument of the plurality of logical instruments:
communicating with a respective client application independently; and
acquiring, generating, or processing data using the at least one corresponding physical measurement device via the at least one measurement engine per the configuration information;
wherein said operating the plurality of logical instruments concurrently comprises:
sharing, by at least two of the logical instruments, use of a single physical measurement device.

14. The method of claim 13, wherein use of a single physical measurement device by a logical instrument comprises operating the single physical measurement device in a plurality of phases, including at least one phase that includes an exclusive portion that requires exclusive access to the single physical measurement device, and wherein sharing comprising:
locking, by a first logical instrument of the at least two logical instruments, the single physical measurement device for duration of the exclusive portion of the at least one phase, thereby blocking others of the at least two logical instruments from using the single physical measurement device for the duration of the exclusive portion of the at least one phase; and
unlocking, by the first logical instrument of the at least two logical instruments, the single physical measurement device when the exclusive portion of the at least one phase completes, thereby allowing use of the single physical measurement device by the others of the at least two logical instruments.

15. The method of claim 14, wherein the exclusive portion of the at least one phase comprises an acquire portion in which data are acquired via the corresponding single physical measurement device.

16. The method of claim 14, wherein the exclusive portion of the at least one phase comprises a generate portion in which signals are generated via the corresponding single physical measurement device.

17. The method of claim 13, wherein the at least one measurement engine comprises a plurality of measurement engines.

18. The method of claim 17, wherein the plurality of measurement engines are configured to operate concurrently.

19. The method of claim 13, wherein said locking and unlocking the single physical measurement device is performed via a mechanism implemented in the at least one measurement engine.

20. The method of claim 19, wherein the mechanism is implemented in the at least one measurement engine using operating system (OS) features.

21. The method of claim 13, wherein the operating system (OS) features comprise one or more of:
   one or more semaphores; or
   at least one mutex.

22. The method of claim 13, wherein the mechanism is implemented in the at least one measurement engine using virtual instrument software architecture (VISA) locks.

23. The method of claim 13, wherein said locking or unlocking comprises one or more of:
   putting threads to sleep; or
   disabling OS interrupts.

24. The method of claim 13, wherein at least one logical instrument of the plurality of logical instruments provides:
   measurement capabilities; and
   analysis functionality implemented in software, wherein the analysis functionality operates on data obtained from the at least one corresponding physical measurement device.

* * * * *